(12) United States Patent
Hall

(10) Patent No.: US 7,143,673 B2
(45) Date of Patent: Dec. 5, 2006

(54) METHOD FOR TUBE END PREPARATION AND MILLING HEAD THEREFORE

(75) Inventor: J. Randall Hall, Wadsworth, OH (US)

(73) Assignee: H&S Tool, Inc., Wadsworth, OH (US)

( * ) Notice: Subject to any disclaimer, the term of this patent is extended or adjusted under 35 U.S.C. 154(b) by 187 days.

(21) Appl. No.: 10/657,890

(22) Filed: Sep. 9, 2003

(65) Prior Publication Data

US 2005/0053440 A1    Mar. 10, 2005

(51) Int. Cl.
*B26D 1/12*    (2006.01)
(52) U.S. Cl. .............................. 82/113; 82/80; 82/201; 82/203.5; 407/48; 409/138; 409/132
(58) Field of Classification Search .................. 408/79, 408/80, 201, 203.5, 233, 713; 82/1.11, 113; 407/48; 409/132, 138
See application file for complete search history.

(56) References Cited

U.S. PATENT DOCUMENTS

| | | | |
|---|---|---|---|
| 1,204,994 A | | 11/1916 | Kendall |
| 2,289,631 A | * | 7/1942 | Cuda et al. ............... 82/128 |
| 2,749,809 A | * | 6/1956 | Anderson ................ 408/80 |
| 2,970,843 A | * | 2/1961 | Bourguignon ........... 279/2.03 |
| 3,007,686 A | * | 11/1961 | Pearson .................. 173/33 |
| 3,051,059 A | | 8/1962 | Davey |
| 3,157,076 A | | 11/1964 | Arthur |
| 3,228,268 A | | 1/1966 | Strout |
| 3,976,388 A | | 8/1976 | Webb |
| 3,999,452 A | * | 12/1976 | Larsen ..................... 82/113 |
| 4,091,699 A | | 5/1978 | Chaze et al. |
| 4,192,067 A | | 3/1980 | Calhoun et al. |
| 4,364,290 A | | 12/1982 | Astle |
| 4,437,366 A | | 3/1984 | Astle |
| 4,449,871 A | | 5/1984 | Hillestad |
| 4,459,883 A | | 7/1984 | Astle |
| 4,486,131 A | | 12/1984 | Eckle |

(Continued)

FOREIGN PATENT DOCUMENTS

GB    2092934 A    8/1982

OTHER PUBLICATIONS

Babcock/Deutsche Babcock Catalog Pages, publication date purportedly Jan. 1992, 5 pages purportedly from Catalog.

*Primary Examiner*—Monica Carter
*Assistant Examiner*—Sara Addisu
(74) *Attorney, Agent, or Firm*—Hudak, Shunk & Farine Co. LPA

(57) ABSTRACT

Tube ends such as those of boiler tube banks, are prepared utilizing any of various combinations of processes which include a step of micro-diameter tube film removal from a portion of a tube end, including an area below a beveled segment, or segment to be beveled. The micro-diameter film removal step provides the tube with an exposed, clean metal surface which is conducive to a subsequent welding or bonding operation performed on the tube. Preferably, the process is performed with a tube milling tool having interchangeable milling or cutting heads. A specialized milling head is also disclosed and, in one embodiment, is at least used to perform the micro-diameter tube film removal step. Advantageously, the tube film removal milling head also removes a weld overlay on one or both sides of a tube in one embodiment. The tube film removal milling head includes an attached blade having a planar face configuration which enables tube film removal.

35 Claims, 4 Drawing Sheets

U.S. PATENT DOCUMENTS

| | | | |
|---|---|---|---|
| 4,498,820 A | 2/1985 | Brennan | |
| 4,601,222 A | 7/1986 | Gill | |
| 4,633,555 A | 1/1987 | Legge | |
| 4,689,920 A | 9/1987 | Geise | |
| 4,691,600 A * | 9/1987 | Carlson et al. | 8/113 |
| 4,718,201 A | 1/1988 | Legge | |
| 4,739,688 A | 4/1988 | Brennan et al. | |
| 4,743,149 A | 5/1988 | Geise | |
| 4,830,551 A | 5/1989 | Brennan et al. | |
| 4,872,249 A | 10/1989 | VanderPol et al. | |
| 4,889,454 A | 12/1989 | Hillestad et al. | |
| 4,958,542 A * | 9/1990 | Skerrett | 82/113 |
| 4,979,294 A | 12/1990 | Bowman et al. | |
| 5,033,347 A | 7/1991 | Hillestad et al. | |
| 5,044,075 A | 9/1991 | Brennan et al. | |
| 5,189,933 A * | 3/1993 | Ricci | 82/113 |
| 5,211,212 A * | 5/1993 | Carlson et al. | 144/241 |
| 5,304,018 A | 4/1994 | LaVanchy et al. | |
| 5,314,270 A | 5/1994 | Lavancy et al. | |
| 5,356,248 A | 10/1994 | Hillestad | |
| 5,531,550 A | 7/1996 | Moruzzi | |
| 5,542,177 A | 8/1996 | Hillestad | |
| 5,911,548 A | 6/1999 | Deiss et al. | |
| 2004/0234349 A1 * | 11/2004 | Ueda et al. | 407/113 |
| 2005/0053432 A1 | 3/2005 | Hall | |

\* cited by examiner

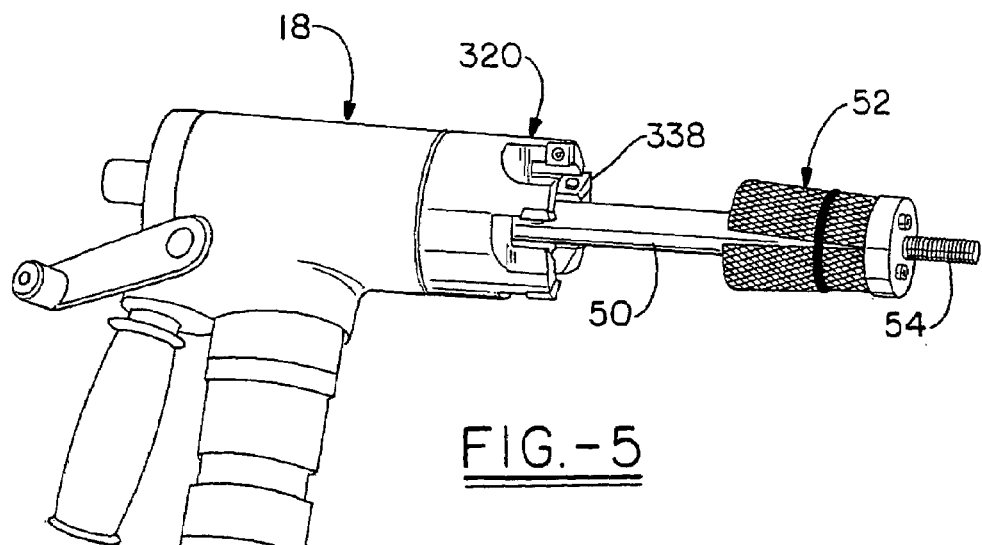
FIG.-5
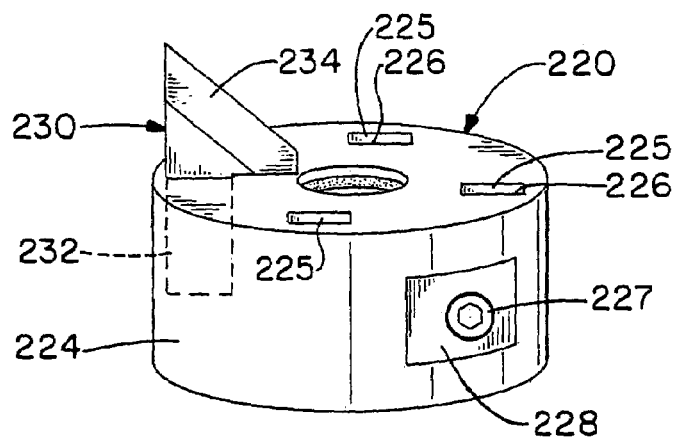
FIG.-6A
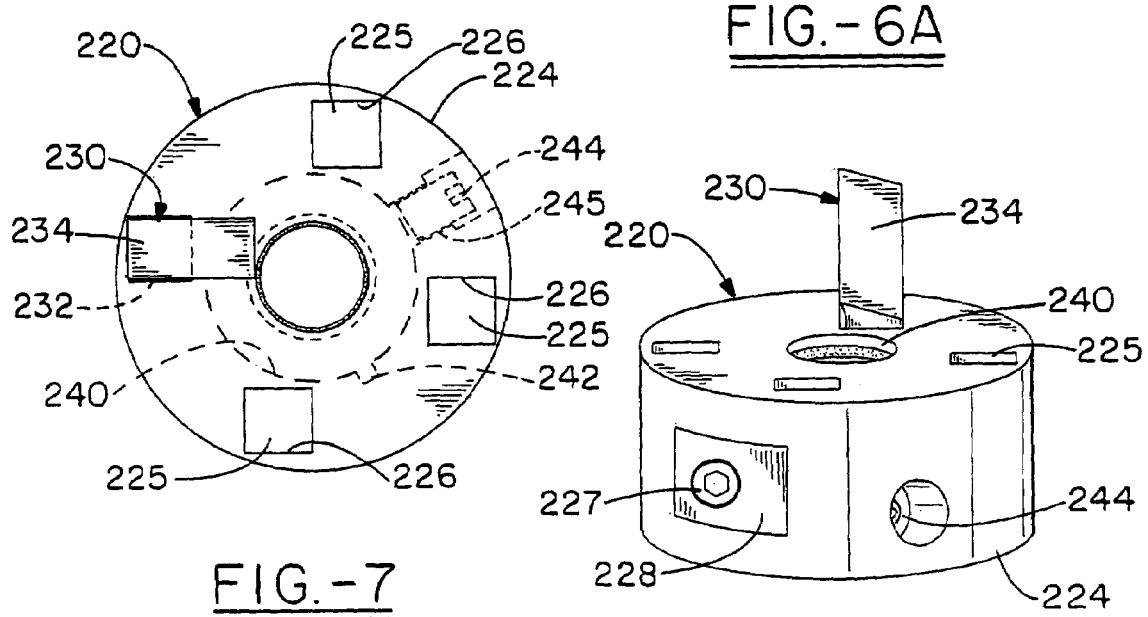
FIG.-7
FIG.-6B

METHOD FOR TUBE END PREPARATION AND MILLING HEAD THEREFORE

FIELD OF THE INVENTION

Tube ends such as those of boiler tube banks, are prepared utilizing any of various combinations of processes which include a step comprising micro-diameter tube film removal from a portion of a tube end in an area or tube segment to be beveled, and optionally in an area adjacent a segment to be beveled. The micro-diameter film removal step provides the tube with an exposed, clean metal surface which is conducive to a subsequent welding or bonding operation performed on the tube. Preferably, the process is performed with a tube milling tool having-interchangeable milling or cutting heads. A specialized milling head is also disclosed and, in one embodiment, is at least used to perform the micro-diameter tube film removal step. Advantageously, the tube film removal milling head also removes a weld overlay on one or both sides of a tube in one embodiment. The tube film removal milling head includes an attached blade having a planar face configuration and attachment means which enables tube film removal.

BACKGROUND OF THE INVENTION

Power generating or other plants circulate fluids, such as water or steam, through tubes or banks of tubes. The fluid is often heated and used, for example, to drive turbines which generate electricity.

The tubes are generally arranged in large panels or banks of parallel tubes which are connected together with a metal membrane or web continuously interposed between each pair of adjacent tubes in the bank to form a tube wall. The tubes generally have an outer diameter which can range from about 1 inch up to about 3 inches, with a wall thickness which can be up to about 0.5 inch. The web or membrane connecting adjacent tubes to each other generally has a thickness about equal to the wall thickness of the tubes, with the width of the webbing generally ranging from about 0.25 inch to about 0.75 inch. The webs or membranes are generally welded to the outer walls of adjacent tubes to form the tube banks. In some cases a weld overlay comprising a metal or alloy is present on portions of the tube bank in an effort to prevent corrosion or deterioration. The weld overlay is present on both sides of a tube bank in some embodiments. On account of deterioration due to corrosion and the like, the tubes occasionally require replacement. Ordinarily, repair of damaged or worn tubing involves cutting and removal of relatively large sections of the tube banks, and replacement with a new panel of tubes. The bank sections are generally replaced in large rectangular sections typically having sizes ranging from a few feet to 10, 20, 100 or even 200 feet in length.

The sections of tube banks which are to be replaced are generally cut out using a power saw or a cutting torch. A method and apparatus for cutting out a section of boiler tube wall is illustrated and described in U.S. Pat. No. 5,033,347, herein fully incorporated by reference.

After the damaged or worn section of tube wall which is to be replaced has been cut out and removed, it is necessary to properly prepare the tube ends exposed by removal of the old section before positioning the new tube bank section in the tube wall opening. Proper preparation of the exposed tube ends of the existing boiler tube wall requires chamfering or beveling of the exposed tube ends to facilitate a good weld between the new tube wall section and the existing boiler tube wall. More specifically, the adjoining tube ends of the existing tube wall and those of the new or replacement section of tube wall should be provided with a frustoconical bevel so that when the adjoining tube ends are placed in alignment, a circumferential groove is formed to receive molten metal from the welding rod. The replacement section of tube wall is usually fabricated and prepared for welding off-site before the damaged or worn section of existing tube wall is removed. The exposed tube ends of the existing tube wall, however, must be prepared for welding on-site, often in a confined space. It is highly desirable that all work performed on the existing tube wall be conducted as quickly and efficiently as possible so as to minimize the period during which the steam generator is taken out of service for repair. Accordingly, preparation of the exposed tube ends of the existing tube wall for welding is generally accomplished using portable hand-held milling tools such as those disclosed in U.S. Pat. Nos. 4,449,871 and 4,889,454, herein fully incorporated by reference.

To facilitate rapid and efficient chamfering or beveling of the exposed tube ends of the existing tube wall using conventional milling tools, and to provide ample space between vertically adjacent tubes for welding around the entire circumference of the tube ends, it is highly desirable and generally necessary to remove a portion of the membrane between each pair of exposed tube ends of the existing tube wall. Typically, it is desirable to remove the membrane between adjacent tube ends, which are exposed by removal of the damaged wall section, from the horizontally cut edge of the existing boiler tube wall to a depth which is at least equal to the depth of the frustoconical bevel which is to be milled at the tube end. Typically, membrane material is removed from the horizontally cut edge between two adjacent tubes to a depth of about 3/8 inch, about 3/4 inch, or about 1 inch or more from the cut edge.

Heretofore, membrane removal utilizing rotary milling tools on an existing tube of a tube wall has been limited to a cutting sweep equal to the outer radius of a tube. Prior art membrane removal heads are not capable of performing tube cleanup and/or weld overlay removal due to milling head blade configuration or design. The prior art membrane removal heads seize, stutter and/or stop cutting when exposed to weld overlay or tube material. After the membrane material and/or welding overlay material removal, a frustoconical bevel is milled on the tube around the entire circumference thereof. Afterwards, a second tube with a corresponding bevel is matched with the first beveled tube and the tubes are welded together by molten metal or solder placed around the joined tubes, especially at the circumferential groove formed by the adjoined beveled tube ends. It has been found that beveled tubes joined in this prior manner without diameter cleanup or film removal often have weaknesses at the weld area, occasionally due to pitting, which causes air pockets or lack of weld strength. It would be beneficial to form a strong durable weld between joined tubes having beveled or chamfered ends.

SUMMARY OF INVENTION

The present invention relates to methods for repair of tubes, especially those used in boiler tube banks. The methods include a tube cleanup step of removing a small or micro-diameter portion or film thickness substantially around the entire circumference of a tube end with a rotary milling device or power tool having a specialized tube film removal milling head. The tube film is removed preferably at least in an area to be beveled, or also in a longitudinal area adjacent an area to be beveled. Advantageously, the film removal milling head is also capable of removing any weld overlay from the surface of a tube. The tube outer circumference film removal step removes a predetermined radial thickness or annulus from the circumference of the outer diameter of the tube. Preferably, the radial film removal provides a substantially bare metal surface. The film removal step provides a tube surface free of rust, scale, etc., and contributes to a stronger weld between adjacent tubes.

In one embodiment, the method includes the usual step of cutting a worn or damaged section from an existing boiler tube wall to provide an opening in the tube wall having upper and lower horizontal edges transverse to the longitudinal direction of the vertical tubes comprising the tube wall. In accordance with the principles of the invention, the membrane material, if present between adjacent tubes of the boiler tube wall, is removed in the immediate vicinity of the exposed tube ends along the horizontal edges cut into the boiler tube wall by means of a power tool having a rotary milling head which is specially adapted for this purpose. The milling head generally includes a mounting portion at one of its axial ends for attaching it to an arbor or shaft of a rotary power tool, and a plurality of membrane cutting blades generally located at the opposite or distal end of the milling head. The milling head includes an arbor adapted to be inserted into an exposed tube end of an existing boiler tube wall from which a worn or damaged section has been removed. The arbor positions and stabilizes the milling head to prevent movement or jerking of the tool in a direction lateral to the longitudinal direction of the tubes during the milling operation. For membrane removal, each of the plurality of angularly disposed cutting blades has a cutting edge radially displaced from the axis of rotation of the membrane milling head to define an annular cutting sweep having an inner radius which is greater than the nominal outer radius of a tube of the tube wall. The radial thickness (i.e. the difference between the inner and outer circumferences along a line passing through the axis or center of the annular cutting sweep) of the cutting sweep is typically from about ⅜ inch to about ½ inch to allow sufficient clearance for subsequent beveling and welding around the tube ends. The cutting sweep of the blades thereby provides for adequate removal of membrane material from between pairs of adjacent tubes of the tube wall in the vicinity of the tube ends without any risk of damage to, or milling of, the tube wall.

An annular recess radially disposed between the arbor and the cutting sweep of the radially disposed blades accommodates and receives a tube end of the tube wall during the milling operation. The depth of the recess is at least equal to the depth of the frustoconical bevel which is to be milled at each of the tube ends. During the milling operation, after the arbor is inserted into one of the tube ends and after the drive means for the power tool is actuated, the tool and attached milling head are urged toward the tube end to gradually mill a desired amount of membrane material from the area immediately adjacent the tube end. The membrane milling operation is then repeated for each of the exposed tube ends to facilitate beveling of the tube ends and to provide ample space between adjacent tubes for welding a new tube bank section to the existing tube wall. The membrane is removed to a suitable depth wherein the tube cleanup can subsequently be performed on a predetermined length of the tube measured from the tube end.

In a further step in one embodiment of the invention, a tube beveling step is performed, either before and/or after a tube cleanup or film removal step. Preferably, the beveling step is performed after the tube cleanup step. The beveling step utilizes a separate milling head attachable to the rotary milling device. As disclosed in U.S. Pat. No. 5,542,177, a milling head which is capable of both membrane removal and beveling of a tube is utilized in some embodiments. The bevel cutting blades, as known to the art, are angled to mill the exposed tube end to form a frustoconical bevel thereon.

It is therefore an object of the invention to provide a method including a tube film removal step preferably on an outer portion of a tube, which is useful to prepare or clean a tube for a subsequent welding operation. In one embodiment, the tube film removal cleanup step is performed simultaneously with a weld overlay removal and/or membrane removal step utilizing the same milling head. In a further embodiment, the novel film removal milling head is utilized to remove only weld overlay in addition to any membrane present, without removing substantially any of the tube outer diameter. The tube film removal step provides a beneficial bonding surface without substantially weakening the tube.

A further object of the invention is to provide a set of milling heads which perform the functions of membrane removal weld overlay removal, tube end beveling, or a combination thereof, in addition to a tube film removal operation, utilizing the same rotary milling device or power tool. The set of interchangeable milling heads utilizable for tube preparation, useable in conjunction with a single milling device, enables a user to be efficient and thus save downtime as well as expense.

BRIEF DESCRIPTION OF THE DRAWINGS

The preferred embodiment of the invention, illustrative of the best mode which applicants have contemplated, is set forth in the following description and is shown in the drawings and is particularly and distinctly pointed out and set forth in the appended claims.

FIG. 5 is a perspective view of a milling tool having a tube film removal, membrane removal, or weld overlay removal, or a combination thereof milling head attached thereto.

FIGS. 6A & 6B are perspective views of a bevel milling head.

FIG. 7 is a bottom view of the bevel milling head shown in FIG. 6.

DETAILED DESCRIPTION OF THE INVENTION

Figure 1:
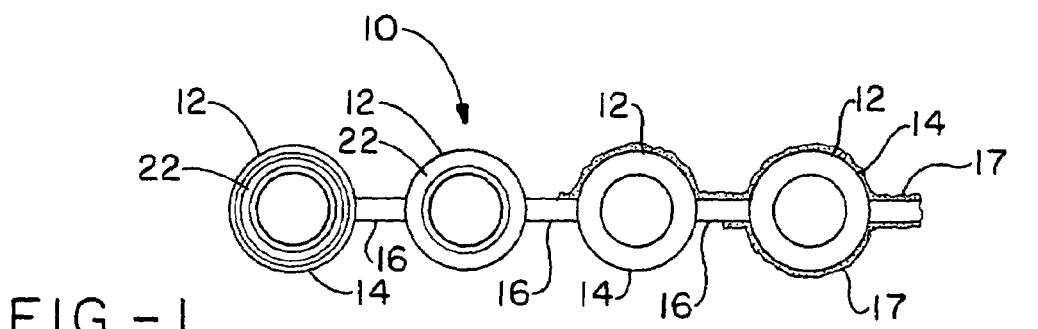
FIG. 1 is a top plan view of a tube wall showing tube ends which have been exposed by removal of a section of the tube wall.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 2:
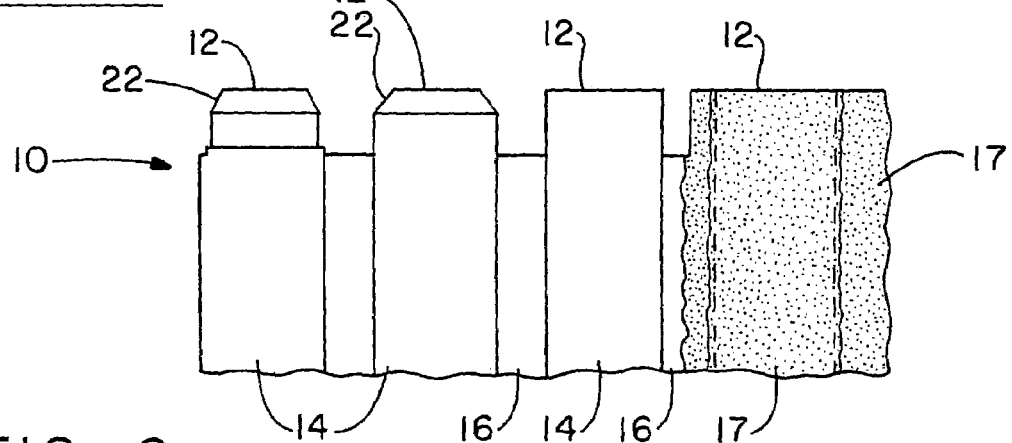
FIG. 2 is a front elevation view of the tube wall of FIG. 1.

There is shown in FIGS. 1 and 2 a portion of a boiler tube wall 10 from which a section has been cut out to expose tube ends 12. The boiler tube wall 10 is comprised of a row of parallel, typically vertically oriented tubes 14, each of which is continuously connected to an adjacent tube by a web or membrane 16. The tubes 14 and membranes 16 are generally formed separately of metal or alloy such as steel and then welded together. Repair of boiler tube walls generally involves cutting out a section of the tube wall which is worn or damaged, chamfering or beveling the tube ends which have been exposed by removal of the worn or damaged section of tube wall, and welding a new or replacement section of tube wall in place of the damaged section which has been removed. The damaged section of tube wall is usually removed by making two horizontally spaced cuts transverse to the longitudinal direction of the tubes 14 and two vertically spaced cuts, which together with the horizontal cuts define a rectangular section which is to be replaced. Before a new or replacement section of the wall can be installed, it is necessary to prepare the tube ends for welding by first removing membrane material from between the tube ends, beveling the tube ends, and also performing a tube film removal or diameter cleanup step extending a predetermined distance below a beveled portion, or portion to be beveled.

In some embodiments, a tube will include a weld overlay 17, either on one or both sides of a tube wall as shown in FIG. 1. The weld overlay is typically a metal coating, such as a pure metal, but more typically an alloy material such as inconel or other alloy which are well known to the art and to the literature, applied to the tube wall to protect against tube corrosion and/or wear. The weld overlay 17 is of varying thickness as it is generally not precisely applied. Accordingly, the weld overlay must be removed in some cases to prepare the tube ends for welding, even though difficult to remove.

Figure 3:
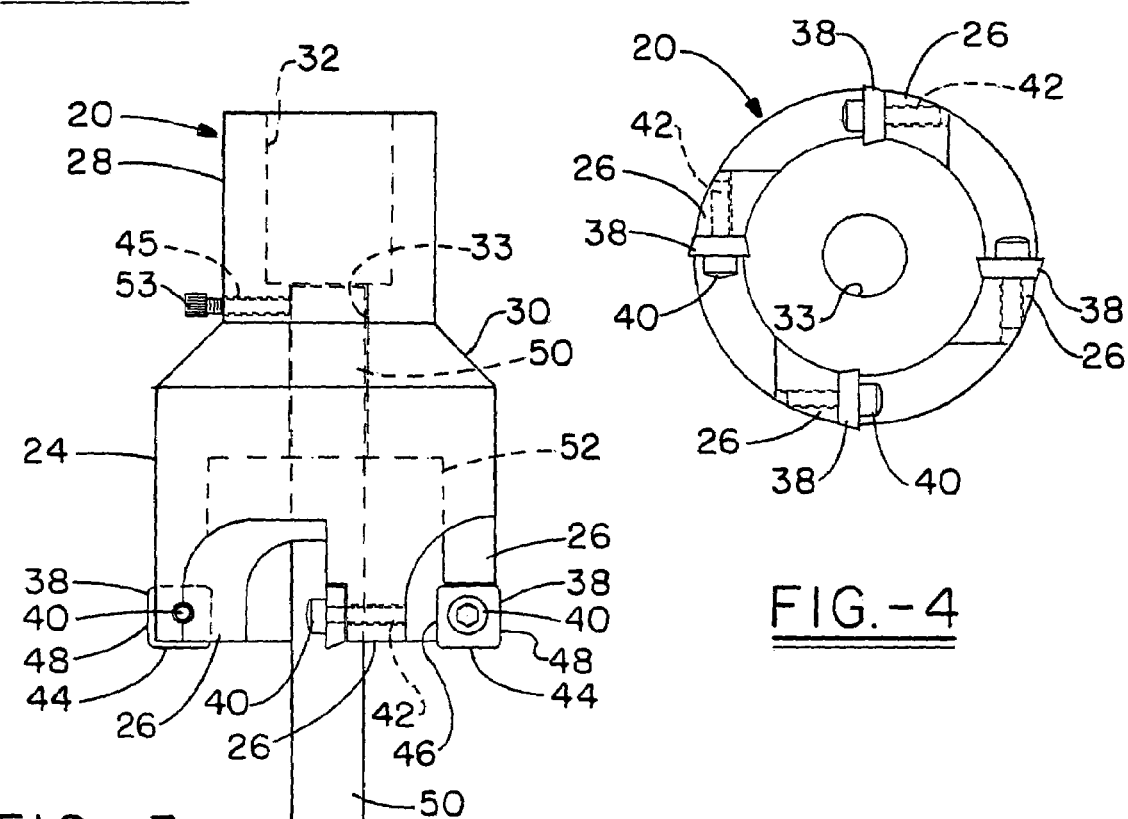
FIG. 3 is a side view of a membrane milling head.
Figure 8:
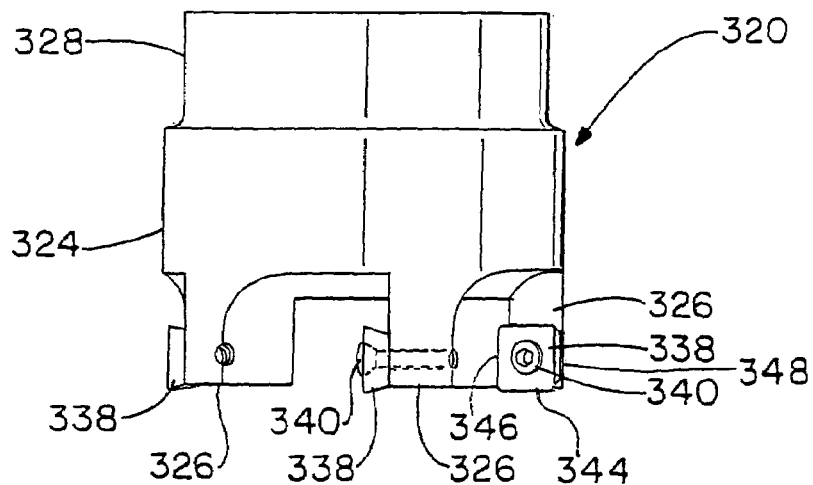
FIG. 8 is a side view of one embodiment of a tube film outer diameter removal milling head.

In one embodiment, the tube ends are prepared utilizing a rotary milling device or power tool 18, as shown in FIG. 5, which is preferably capable of utilizing interchangeable milling heads 20, 220, and 320 as shown in FIGS. 3, 6, and 8. Rotary milling devices are well known in the art and are commercially available from sources such as H&S Tool of Wadsworth, Ohio. Examples include, but are not limited to, Model MB, Model MS, Model B, Model MT, and Model MFT. Rotary milling devices are generally electrically or pneumatically powered.

Figure 4:
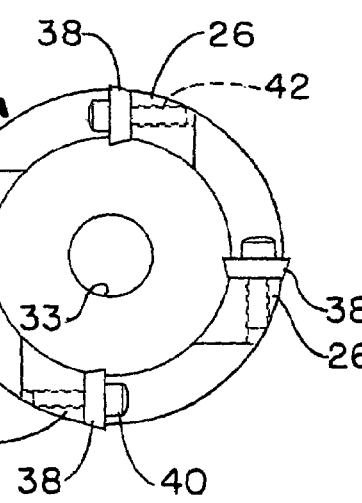
FIG. 4 is a bottom view of the membrane milling head shown in FIG. 3.

In one embodiment, the membrane cutting rotary milling head 20 (FIGS. 3 and 4) of the invention is used to remove membrane material from between tubes. The head 20 has a generally cylindrical body 24 with a plurality of axially extending radial cutting blade supports 26 at one end and a reduced diameter coaxial cylindrically shaped tool mounting portion 28 at the other end, with an intervening frustoconical section 30 connecting the body 24 with the mounting portion 28. The mounting portion has a coaxial cylindrical bore 32 for removably receiving an arbor of the power tool 18. In one embodiment, the cylindrical bore 32 preferably includes a key slot which matingly engages a key on the tool gearing to lock the rotary milling head 20 to the tool. The milling head 20 also preferably includes a bore 33 through which a center shaft or arbor 50 is adapted to extend. The mounting portion 28 of the rotary milling head 20 is provided with a plurality of radial threaded bores which receive hexagonal socket screws which are used to removably secure the milling head to the power tool 18. Of course, various other means for mounting the milling head 20 to an output shaft of a rotary tool are possible, such as a threaded bore on the milling head mounting portion for screwing the milling head to a threaded output shaft of a rotary tool, or any of various conventional tool chucks or other means for mounting a tool piece to the output shaft of a rotary power tool.

A cutting blade 38 is removably secured to each of the cutting blade supports 26 by means of a hexagonal socket screw 40 received in a threaded bore 42 provided in each of the cutting blade supports 26. The cutting blades 38 are preferably generally square-shaped and have at least three cutting edges 44, 46 and 48, with cutting edge 44 being generally perpendicular to the rotational axis of the milling head 20, and the other two cutting edges 46,48 being parallel to the rotational axis of the milling head with the space there between being coextensive with the length of the cutting edge 44 and defining the cutting sweep of the blades 38. The inner radius of the annular cutting sweep is preferably greater than the outer radius of the tube of the tube wall to be milled or the greatest radial distance of the weld overlay, if present, measured from a center point or longitudinal axis of the tube, and the outer radius of the cutting sweep is equal to the sum of the radius of tube of the tube wall or overlay outer radius plus from about 50 to 100 percent of the width of the membrane material between adjacent tubes.

More preferably, the square cutting blade 38 can be provided with cutting edges, 44, 46, and 48, plus a fourth cutting edge opposite cutting edge 44. This allows for extended use of the blade 38. For example, if one of the edges becomes chipped, it would be possible to loosen the screw 40, rotate the blade 38 so that the damaged edge is facing the blade support and is no longer used as a cutting edge, and then retighten screw 40.

In accordance with a preferred embodiment of the invention, cutting edges 44, 46, and 48 preferably have a positive rake to provide for the fastest possible cutting speed. However, blades having a neutral rake or a negative rake can also be used and have certain other advantages. For example, negative rake blades wear better, but require a longer cutting time. Blades having neutral rake cutting edges (i.e., flat cutting edges) wear and cut at a rate intermediate between blades having positive and negative rake cutting edges.

Neutral rake blades have the additional advantage of being reversible, i.e., the blade can be rotated about an axis normal to the cutting edge thereby providing for extended use.

Other blade shapes, such as triangular-shaped blades, can be used but are less desirable. Likewise, it is not necessary that one of the cutting edges of each of the blades be perpendicular to the rotational axis of the milling head 20. However, square blades arranged with one of the cutting edges 44 being perpendicular to the rotational axis of the milling head are highly preferred because they provide the greatest cutting efficiency and lowest potential for damage and wear of the blades. It has been generally found that more blades provide for better cutting efficiency and reduced blade damage and wear. However, it becomes increasingly difficult to machine milling heads with more than four or five blade supports and to change blades when there are more than four or five blade supports. Accordingly, the milling head 20 can preferably have about four or five blade supports 26 which are angularly disposed in a symmetrical fashion around the circumferential axis of the milling head. The cutting blades 38 can be made of any suitably hard material, such as tungsten carbide, customarily used for cutting or milling steel and other metals or alloys.

In a preferred embodiment, the rotary milling tool includes an arbor 50 extending outward from the cutting end of a milling head to guide and stabilize the rotary milling tool during the milling operation. Arbors and stabilization means are well known in the art. One example of an arbor 50 having a securing collet 52 attached thereto is illustrated in FIG. 5. The arbor 50 is inserted into a tube end opening before the milling operation and is preferably aligned axially with the rotational axis of the milling head. The arbor 50 is preferably removably secured within the tube utilizing a securing device such as collet 52. In one embodiment, the collet comprises three segments held together by a plate, screws and an o-ring, forming a single assembly. The collet is attached to the arbor 50 of the milling tool 18 by a threaded rod 54 passing through the arbor 50. Mating tapers on the collet and arbor 50 allow the collet to be drawn-up on the arbor 50 by rotating the threaded rod 54, thereby expanding the collet until it contacts and locks into the inside diameter of the tube. The collet 52 and arbor 50 remain stationary in the tube while the milling tool is engaged and the milling head rotates about the shaft while performing its machining operation. In operation, the rotary milling tool is advanced along the arbor towards and into the tube being milled, or away therefrom to perform the desired milling, i.e., material removal operation on the membrane or tube end, etc. The arbor and any associated securing device such as a collet 52 is removed from the tube once the desired tube milling operation has been completed.

A second milling head, bevel head 220 of the invention is shown in FIGS. 6A, 6B and 7. The bevel milling head 220 is capable of being used to form a frustoconical bevel 22 on the end of the tube 14 in a tube bank 10. The bevel milling head 220 has a generally cylindrical body 224 with a plurality of openings 225, such as the square shaped recesses shown which define the cutting blade support 226. Cutting blade 230 has a blade securing portion 232 which fits in opening 225 of body 224 and is bounded by cutting blade support 226 and secured the secured therein by affixing element such as set screw 227. Opening 228 is appropriately sized to enable a tool such as a hexdriver or the like to be used to attach the blade 230 to the blade support.

The bevel milling head 220 includes a coaxial cylindrical bore 240 removably receiving a rotary gear or output shaft of the rotary milling device. The cylindrical bore 240 preferably includes a key slot 242 which matingly engages a key on the gear to lock the bevel milling head 220 to the rotary portion of the tool. The bevel milling head 220 can be further secured to the tool utilizing a fixing element such as set screw 244 which travels in threaded bore 245. The method of securing illustrated can be substituted with various other means for mounting the milling head as known in the art. Other securing mechanisms including providing the cylindrical bore 240 with internal threads which cooperate with a threaded output shaft on the rotary milling tool, as well as various other conventional tool chucks or means for mounting a tool piece to an output shaft of a rotary power tool.

The bevel cutting blade 230 secured to the cutting blade support 226 by means of the threaded fastener such as set screw 227 received in threaded bore 229 has an angled cutting edge 234 which is generally disposed in an angular relationship to bore 240 in the arbor of the rotary milling device. The cutting edge 234 of beveling bade 230 is arranged at an appropriate angle for providing the desired frustoconical bevel. The angle of the cutting edge 234 with the rotational axis of the milling tool is generally from about 30° to about 60°, and more preferably from about 30° to about 45°. The one or more beveled blades are axially located such that the bevel cutting blades define an annular cutting sweep capable of beveling a tube from the inner diameter to the outer diameter thereof. Bevel milling head 220 connected to the rotary milling tool is utilized in the manner similar as milling head 20. At the onset of the milling operation, the bevel milling head is advanced toward the tube end until the cutting edges 234 of the beveling milling head come into contact with the tube end. The rotary milling tool 18 is preferably temporarily connected or secured to the tube to be beveled using a collet or other securing device as known in the art and described herein. The bevel cutting edge 234 is advanced towards the tube until the desired bevel has been placed or cut into the tube.

Figure 9:
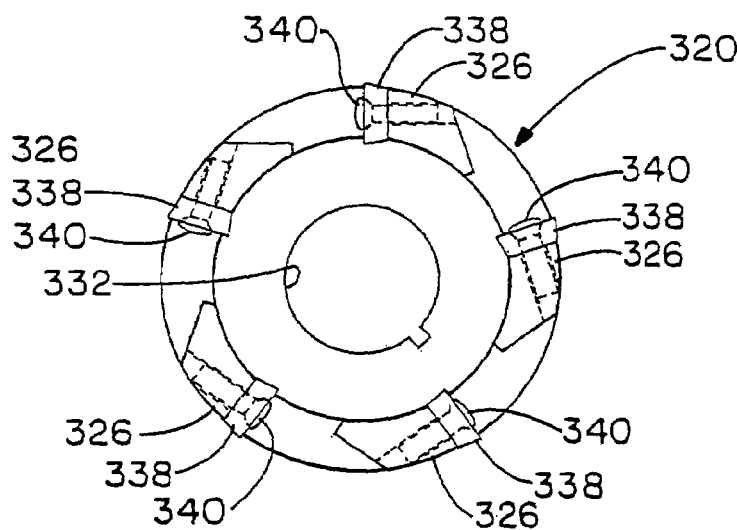
FIG. 9 is a bottom view of the milling head of FIG. 8.

A preferred diameter tube film removal milling head 320 is shown in FIGS. 5, 8 and 9 and is used to prepare a tube end for a subsequent welding operation. The diameter tube film removal step is performed preferably before, or after the tube end has been beveled such as by using the bevel milling head 220. The diameter tube film removal step cuts, grinds, or otherwise removes a film or thin annulus from the outer surface of the tube, preferably substantially completely or completely around the circumference thereof. That is, a portion of the tube outer diameter is removed, in addition to any weld overlay material and/or membrane material remaining on or surrounding the tube in the area where the diameter cleanup step is performed.

The diameter cleanup milling head 320 has a configuration or design which allows the blades thereof to mill a portion of a tube, as well as any weld overlay and/or membrane that is present on one or more sides of the tube. The blade has a cutting face which is self-cleaning and provides for continuous cutting of surfaces, especially continuous or semi-continuous surfaces such as, but not limited to, tube circumference, weld overlay and membrane. The self-cleaning ability of the milling head substantially prevents the head from seizing, catching, and/or stopping during operation and sheds chips or shavings away from the blade cutting surfaces preferably allowing continuous, uninterrupted cutting and rotation.

The tube film removal, such as with milling head 320, and optionally weld overlay removal and/or membrane removal is performed to a predetermined depth measured from a tube end generally from about 0.25 to about 0.75 inch, desirably to about 1 inch, and preferably to about 1.5 inches or more. The tube film removal step removes an outer radial portion of the tube in a range generally in an amount from about 2% up to about 20%, or about 25%, desirably up to about 15%, and preferably up to about 5% or about 10% of the total tube radial thickness (annulus), measured from the inner radius to the outer radius of the tube in a radial direction from the center point or longitudinal axis of the tube. The tube film removal step exposes a clean, bare-metal surface on the outer portion of the tube in the cleanup area. Rust, scale, or the like is removed during cleaning. The milled tube surface provides a strong bonding area for a subsequent welding operation.

As shown in FIG. 8, the preferred multi-purpose tube film removal milling head 320 includes a plurality of axially extending radial cutting blade supports 326 at one end and a tool mounting portion 328 at the other end with body 324 there between. The mounting portion 328 has a cylindrical bore 332 for removably receiving rotary gearing of the rotary milling tool 18. In one embodiment, the cylindrical bore 332 includes a key slot which matingly engages a key on the tool gearing to lock the diameter cleanup milling head 320 to the tool rotary gearing. Various other means for mounting the head as described hereinabove or known to the art can alternatively be utilized.

A cutting blade 338 is removably secured to each of the cutting blade supports 326 preferably by means of a low profile securing element 340 such as a screw or fastener received in the threaded bore 354 for each of the cutting blades supports 326.

Figure 10:
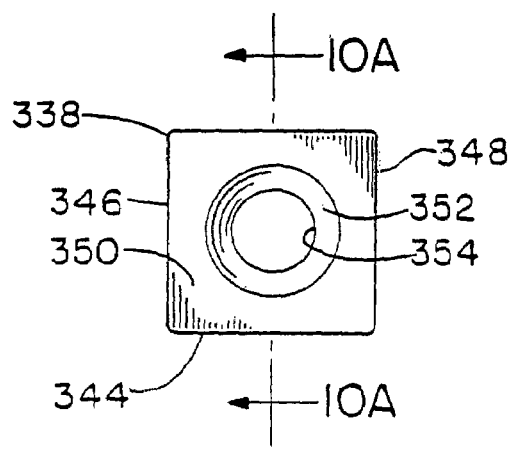
FIG. 10 is a front elevation view of a film removal blade.
Figure 10A:
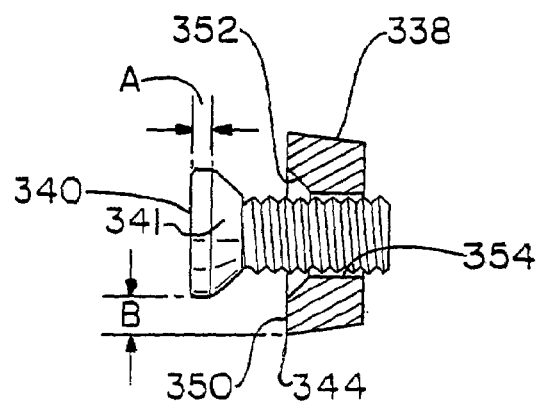
FIG. 10A is a cross section view of FIG. 10 through line 10A.
Figures 11, 12:
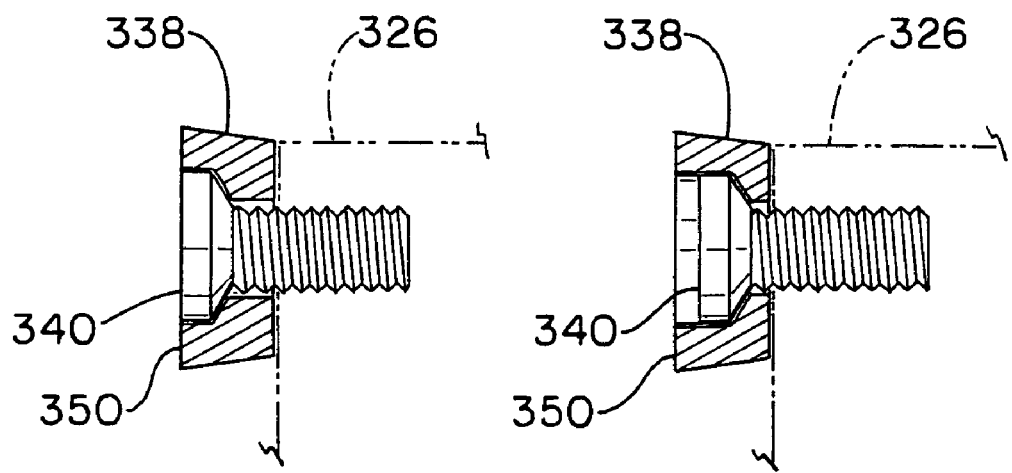
FIG. 11 is a cross section view through a portion of an outer diameter film removal blade of a milling head wherein the securing element head portion has an end which is flush mounted in relation to a blade face.
FIG. 12 is a cross section view through a portion of an outer diameter film removal blade of a milling head wherein the securing element head portion has an end which is recess mounted in relation to a blade face.

In one embodiment illustrated in FIGS. 10 and 10A, the blade 338 includes a face surface 350 having a countersink or recess 352 surrounding bore 354 through which the securing element 340 connects blade 338 to a portion of the milling head, i.e., blade support 326. In a preferred embodiment which advantageously provides the ability to cut away and remove tube films, weld overlay, or membrane, or a combination thereof, the low profile securing element 340 has a portion, such as a screw head, end portion, or the like, which extends a distance A away or out from the face surface which is less than or about equal to a second distance B measured from an outer, lower edge of securing element 340 to the bottom or lower surface cutting edge 344 as shown in FIG. 10A. Distance A when compared to distance B is generally less than about 100%, desirably less than about 95%, and preferably less than about 90%. In one further preferred embodiment, the blade recess 352 is dimensioned so that the attachment element 340 in a seated position provides the face surface 350 with a flat face. That is, the top of the head of securing element 340 is flush mounted or recess mounted on face surface 350.

As shown in FIG. 10, the cutting blade 338 is preferably generally square shaped and has at least three cutting edges 344, 346, 348, with lower cutting edge 344 being generally perpendicular to the rotational axis of the milling head 320, and the other two cutting edges 346 and 348 being parallel to the rotational axis of the milling head with the space therebetween being coextensive with the length of the cutting edge 344 and defining the cutting sweep of the blades 338. The inner radius of the annular cutting sweep is such that a predetermined amount of the outer radial portion of the tube is removed, within the above stated ranges. As noted hereinabove, the cutting edges of the blades have either positive, neutral, or negative rakes. Alternatively, the blade for the diameter cleanup milling head can be formed in other shapes as described hereinabove with respect to blade 38.

The milling heads 20, 220, and 320 of the present invention are generally used with any of various power tools having a rotating shaft. The tool motor can be electrically, hydraulically or pneumatically driven, with air driven motors being generally preferred. It has been found that the speed rotation of the milling head, such as from about 55 to about 6,000 rpm and more preferably from about 80 to about 150 rpm is highly desirable to achieve efficient cutting and reduced wear and damage to the blades and milling head. In operation, the milling tool is fitted with a desired milling head and utilized to perform a milling operation on a tube according to the purpose or design of the milling head.

In a preferred embodiment, a membrane milling head 20 is utilized to remove a membrane connecting one tube to a second tube. The membrane removal operation is performed to a predetermined depth. Afterwards, a tube film removal milling head 320 is attached to the rotary milling tool and utilized to remove a predetermined amount of tube film from the outer diameter of the tube, as well as any weld overlay and/or membrane material present. The tube film removal milling step is performed to a predetermined depth which preferably extends below an area to be beveled. In a further step, a bevel milling head 220 is attached to the rotary tool and a bevel is cut into the tube end before a second tube end is connected thereto such as by welding. In further embodiments, the tube film removal step can be performed after the tube beveling step. In yet a further embodiment, the tube film removal milling head can be used to remove membrane, weld overlay, or tube film, or a combination thereof. It is an important benefit of the present invention that a single milling tool can utilize a number of interchangeable milling heads to prepare a tube end for a subsequent operation such as welding.

In accordance with the patent statutes, the best mode and preferred embodiment have been set forth, the scope of the invention is not limited thereto, but rather by the scope of the attached claims.

What is claimed is:

1. A rotary milling head for a rotary milling tool, comprising:
    a cylindrical milling head body having an annular recess adapted to accept an end of a metal tube, said milling head body adapted to be connected to the rotary milling tool;
    one or more cutting blades connected to said milling head body by a securing element, each said blade disposed circumferentially around the rotational axis of the milling head and the annular recess, each said blade having one or more cutting edges including a lower cutting edge, said one or more cutting edges defining an annular cutting sweep having an inner radius and an outer radius greater than an outer diameter of the tube, said cutting sweep adapted to remove from about 2% to about 25% of an outer radial thickness of the tube and any weld overlay and membrane present on said tube within said annular cutting sweep, wherein said lower cutting edge extends below a lower end of said milling head body, and wherein said blade has a face surface with a bore extending therethrough through so that said securing element connects said blade to said milling head body, said blade having a countersink around said bore and receiving at least a portion of a head of said securing element.

2. The milling head according to claim 1, wherein said securing element connects said blade to said body whereby the securing element head portion has an end which is flush mounted or recess mounted in relation to said blade face.

3. The milling head according to claim 1, wherein said securing element connects said blade to said body whereby the securing element has a head portion which extends from said blade face surface a first distance which is less than or equal to a second distance measured from a lower edge of the securing element head to said lower cutting edge of the blade.

4. The milling head according to claim 2, wherein said blade cutting sweep inner radius is from about 2% to about 15% of said annular tube thickness.

5. The milling head according to claim 3, wherein said blade cutting sweep inner radius is from about 2% to about 15% of said annular tube thickness.

6. The milling head according to claim 2, wherein said blade cutting sweep inner radius is from about 2% to about 10% of said annular tube thickness.

7. The milling head according to claim 3, wherein said blade cutting sweep inner radius is from about 2% to about 10% of said annular tube thickness.

8. The milling head according to claim 5, wherein said first distance is less than about 95% of said second distance.

9. The milling head according to claim 5, wherein said first distance is less than about 90% of said second distance.

10. A milling head for a rotary milling tool, comprising:
a cylindrical milling head body having an annular recess adapted to accept an end of a metal tube, said body adapted to be connected to the rotary milling tool;
one or more cutting blades connected to said milling head body by a securing element, each said blade disposed circumferentially around the rotational axis of the milling head and the annular recess, each said blade having one or more cutting edges defining an annular cutting sweep having an inner radius and an outer radius greater than an outer diameter of the tube, said cutting sweep adapted to remove an outer radial thickness from the tube in an amount of from about 2% up to about 25% of said annular tube thickness and any weld overlay and membrane present on said tube within said annular cutting sweep, wherein said blade has a face surface and an opposite surface with a bore extending therebetween through which said securing element connects said blade to said body, said blade having a countersink around said bore receiving at least a portion of a head of said securing element, and wherein said securing element connects said blade to said body whereby the securing element has a head portion with an end which either (a) extends from said blade face surface a first distance which is less than or equal to a second distance measured from a lower edge of the securing element head to a lower cutting edge of the blade, (b) is flush mounted in relation to said blade face, or (c) is recess mounted in relation to said blade face, wherein the blade lower cutting edge that extends below a lower end of the body in order to mill the tube outer diameter and any weld overlay or membrane present on the tube within the annular cutting sweep.

11. The milling head according to claim 10, wherein the securing element head portion has an end which is (b) flush mounted or (c) recess mounted in relation to said blade face.

12. A method for preparing a metal tube end, comprising the steps of: providing a rotary milling tool comprising a milling head adapted to at least remove a predetermined amount of tube material from an outer diameter surface of the metal tube, wherein the milling head comprises a cylindrical body having an annular recess, said body connected to the rotary milling tool, and one or more cutting blades connected to a cutting blade support of said body by a securing element, each said blade disposed circumferentially around the rotational axis of the milling head, each said blade disposed circumferentially around the rotational axis of the milling head, each said blade having a cutting edge defining an annular cutting sweep having an inner radius that removes material from the outer diameter surface of the tube in an amount of from about 2% up to about 25% of a radial thickness of the tube, and an outer radius at least equal to said tube outer diameter, wherein the said one or more blades have a lower cutting edge that extends below a lower end of said milling head body, the rotary milling tool further including an arbor and a securing device attached to the arbor; securing the arbor of the milling tool on the tube with the securing device; and milling the outer diameter surface of the tube with the milling head and removing tube material from the outer diameter surface of the tube while the arbor remains stationary in the tube while the milling head rotates around the arbor.

13. A method according to claim 12, further including the step of removing a membrane adjacent said tube end, or a weld overlay adjacent said tube end, or a combination thereof to a predetermined depth measured from the tube end.

14. A method according to claim 12, further including the step of removing a weld overlay from a front portion or a back portion of said tube, or a combination thereof, with said first milling head to a predetermined depth measured from the tube end simultaneously with said tube radial thickness removal step.

15. A method according to claim 12, wherein said tube material removal step is performed to a depth of from about 0.25 to about 1.5 inches when measured from said tube end, and wherein the milling head blade has a face surface and an opposite surface with a bore extending therebetween through which the securing element connects said blade to said body, said blade having a countersink around said bore capable of receiving at least a portion of a head of said securing element.

16. A method according to claim 15, wherein up to about 10% of said tube radial thickness is removed, and wherein said depth is from about 0.25 to about 1 inch, and wherein said securing element connects said blade to said body whereby the securing element head portion has an end which is flush mounted or recess mounted in relation to said blade face.

17. The method according to claim 15, wherein said securing element connects said blade to said body whereby the securing element head portion has an end which is flush mounted or recess mounted in relation to said blade face.

18. The method according to claim 15, wherein a beveling step is performed on the tube end with a second milling head, and wherein said securing element connects said blade to said body whereby the securing element has a head portion with an end which either (a) extends from said blade face surface a first distance which is less than or equal to a second distance measured from a lower edge of the securing element head to a lower cutting edge of the blade, (b) is flush mounted in relation to said blade face, or (c) is recess mounted in relation to said blade face.

19. The method according to claim 18, wherein said securing element head portion end is (b) flush mounted or (c) recess mounted in relation to said blade face.

20. A method for preparing a tube end, comprising the steps of:
connecting a milling head to a rotary milling tool, wherein the milling head comprises a cylindrical milling head body having an annular recess adapted to accept an end of a metal tube, said milling head body connected to the rotary milling tool, and one or more cutting blades connected to said milling head body by a securing element, each said blade disposed circumferentially around the rotational axis of the milling head and the annular recess, each said blade having one or more cutting edges including a lower cutting edge, said one or more cutting edges defining an annular cutting sweep having an inner radius and an outer radius at least equal to an outer diameter of tube, said cutting sweep adapted to remove from about 2% to about 25% of an outer radial thickness of the tube and any weld overlay and membrane present on said tube within said annular cutting sweep, wherein said lower cutting edge extends below a lower end of said milling head body, and wherein said blade has a face surface with a bore extending therethrough through so that said securing element connects said blade to said milling head body, said blade having a countersink around said bore and receiving at least a portion of a head of said securing element, wherein the milling tool includes an arbor to stabilize and guide the rotary milling tool during operation;

securing a securing device of the arbor within the tube; and removing at least a circumferential outer diameter surface of the tube with the milling head, wherein the milling head rotates and the arbor remains stationary during the removal.

21. The method according to claim 20, wherein the securing device is a collet.

22. The method according to claim 20, wherein the outer radial portion of the tube is removed to depth of at least 0.25 inch measured from the end of the tube.

23. The method according to claim 20, wherein the outer radial portion of the tube is removed to depth of at least 0.25 inch to about 1.5 inches measured from the end of the tube.

24. The method according to claim 23, wherein the tube outer radial portion removal removes from about 2% to about 15% of the tube radial thickness.

25. The method according to claim 22, further including the step of removing a membrane adjacent said tube end, or a weld overlay adjacent said tube end, or a combination thereof to said depth with the milling head.

26. The method according to claim 20, further including the step of removing a membrane adjacent said tube end, or a weld overlay adjacent said tube end, or a combination thereof to said depth.

27. The method according to claim 20, further including the step of removing by milling a weld overlay or membrane or both present on the tube within said annular cutting sweep to said depth.

28. The method according to claim 22, further including the step of removing by milling a weld overlay or membrane or both present on the tube within the annular cutting sweep to said depth.

29. A rotary milling tool, comprising:
a rotary milling device;
a milling head operatively connected to rotary gearing of the rotary milling device and capable of rotating around a central axis when activated by the device, wherein the milling head includes a cylindrical body having an annular recess, wherein the milling head includes one or more cutting blades connected to said body by a securing element, each said blade disposed circumferentially around the rotational axis of the milling head, each said blade having a cutting edge defining an annular cutting sweep having an inner radius which is adapted to remove an outer radial thickness from an annular metal tube in an amount of from about 2% up to about 25% of said annular tube thickness, and an outer radius at least equal to said tube outer diameter, and wherein said blade has a face surface with a bore extending therethrough through which said securing element connects said blade to said body, said blade having a countersink around said bore and receiving at least a portion of a head of said securing element, wherein the blade has a lower cutting edge that extends below a lower end of the body in order to mill the tube outer diameter and any weld overlay or membrane present on the tube within the annular cutting sweep; and an arbor extending through a bore in the milling head and connected to the rotary milling device so that the arbor remains stationary when the milling device is activated and the milling head rotates, wherein the arbor includes a securing device and is adapted to be secured in the tube.

30. The milling tool according to claim 29, wherein the securing element head portion has an end which is flush mounted or recess mounted in relation to said blade face.

31. The milling tool according to claim 29, wherein the securing element has a head portion which extends from said blade face surface a first distance which is less than or equal to a second distance measured from a lower edge of the securing element head to the lower cutting edge of the blade.

32. The milling tool according to claim 30, wherein said blade cutting sweep inner radius is from about 2% to about 15% of said annular tube thickness.

33. The milling tool according to claim 31, wherein said blade cutting sweep inner radius is from about 2% to about 15% of said annular tube thickness.

34. The milling tool according to claim 33, wherein said blade cutting sweep inner radius is from about 2% to about 10% of said annular tube thickness and wherein said first distance is less than about 95% of said second distance.

35. The milling tool according to claim 33, wherein said blade cutting sweep inner radius is from about 2% to about 10% of said annular tube thickness wherein said first distance is less than about 90% of said second distance.

* * * * *